US012597255B2

(12) United States Patent
Eames et al.

(10) Patent No.: US 12,597,255 B2
(45) Date of Patent: Apr. 7, 2026

(54) SWIMMING POOLS AND SPAS WITH POOL VISION

(71) Applicant: ZODIAC POOL SYSTEMS LLC, Carlsbad, CA (US)

(72) Inventors: Darin Eames, Carlsbad, CA (US); Dindo Uy, North Hollywood, CA (US); Mark J. Bauckman, San Marcos, CA (US); Robert Warren Stiles, Jr., San Marcos, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 22 days.

(21) Appl. No.: 18/231,364

(22) Filed: Aug. 8, 2023

(65) Prior Publication Data

US 2024/0046651 A1 Feb. 8, 2024

Related U.S. Application Data

(60) Provisional application No. 63/395,965, filed on Aug. 8, 2022.

(51) Int. Cl.
*G06V 20/52* (2022.01)
*A63B 69/12* (2006.01)
(Continued)

(52) U.S. Cl.
CPC .............. *G06V 20/52* (2022.01); *A63B 69/12* (2013.01); *E04H 4/1654* (2013.01); *G06V 10/56* (2022.01);
(Continued)

(58) Field of Classification Search
CPC ..................................................... G06V 20/52
See application file for complete search history.

(56) References Cited

U.S. PATENT DOCUMENTS 8,578,538 B2  11/2013  Moore et al.
9,488,154 B2  11/2016  van der Meijden
(Continued)

FOREIGN PATENT DOCUMENTS

EP       4029576 A1    7/2022
WO    2014143779 A2   11/2014
WO    2020227114 A1   11/2020

OTHER PUBLICATIONS

International Application No. PCT/US2023/029761, International Search Report and Written Opinion mailed on Jan. 30, 2024, 21 pages.
(Continued)

*Primary Examiner* — Y Lee
(74) *Attorney, Agent, or Firm* — Kilpatrick Townsend & Stockton LLP

(57) ABSTRACT
A pool vision system may include a camera and a controller. A method of controlling equipment of a swimming pool or spa using the pool vision system may include receiving visual data from the camera having a field of view including the equipment and identify the equipment in the visual data and determining an operational state of the equipment based on the visual data. The method incudes comparing the determined operational state of the equipment with an expected operational state of the equipment and generating a control response based on a difference between the determined operational state of the equipment and the expected operational state of the equipment.

12 Claims, 2 Drawing Sheets

(51) Int. Cl.
    *E04H 4/16*        (2006.01)
    *G06V 10/56*     (2022.01)
    *G06V 40/20*     (2022.01)
    *G08B 21/08*     (2006.01)

(52) U.S. Cl.
    CPC .............. *G06V 40/20* (2022.01); *G06V 40/23*
        (2022.01); *G08B 21/08* (2013.01); *G06V*
                          *2201/07* (2022.01)

(56)             References Cited

U.S. PATENT DOCUMENTS

| | | |
|---|---|---|
| 10,316,534 B2 | 6/2019 | Michelon et al. |
| 2010/0299016 A1 | 11/2010 | Benzler et al. |
| 2014/0263087 A1 | 9/2014 | Renaud et al. |
| 2014/0303810 A1 | 10/2014 | van der Meijden et al. |

OTHER PUBLICATIONS

International Application No. PCT/US2023/029761, Invitation to Pay Additional Fees and, Where Applicable, Protest Fee mailed on Dec. 7, 2023, 14 pages.
International Application No. PCT/US2023/029761, International Preliminary Report on Patentability mailed on Feb. 20, 2025, 14 pages.

SWIMMING POOLS AND SPAS WITH POOL VISION

REFERENCE TO RELATED APPLICATION

This application claims the benefit of U.S. Provisional Patent Application No. 63/395,965, filed on Aug. 8, 2022, and entitled SWIMMING POOLS AND SPAS WITH POOL VISION, the content of which is hereby incorporated by reference in its entirety.

FIELD OF THE INVENTION

The invention relates to systems and methods for water-containing vessels such as swimming pools and spas, and more particularly to systems and methods using visual data for pool operations.

BACKGROUND OF THE INVENTION

A swimming pool or spa may be used for a variety of recreational and competitive activities. For example, a pool owner may swim laps in his or her pool for exercise, the pool owner may host other guests for a party, etc. Traditionally, control of equipment for the swimming pool or spa for the various activities has required user input and/or control, and the pool customization and personalization to the user is limited.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a pool vision system for a swimming pool or spa includes a processor and a camera for monitoring a location comprising the swimming pool or spa.

According to some embodiments, a pool vision system includes a camera for monitoring a location including a swimming pool or spa.

According to various embodiments, a pool vision system includes a camera for monitoring occupants of a swimming pool or spa and generating a response based on visual data from the camera.

According to some embodiments, a pool light for a swimming pool or spa includes a camera integrated with the pool light.

According to certain embodiments, a method of operating a swimming pool or spa includes monitoring occupants of a swimming pool or spa using a camera of a pool vision system and generating a response based on visual data from the camera.

According to various embodiments, a method includes determining water turnover rate in a swimming pool or spa based on a temperature information from an automatic swimming pool cleaner and visual data from a thermal camera of a pool vision system.

According to certain embodiments, a pool vision system may include a thermal camera for detecting water stratification layering within a swimming pool or spa.

According to some embodiments, a method includes controlling a pump filtration cycle based on an actual turnover determination using a pool vision camera system.

According to various embodiments, pool vision system for a swimming pool or spa includes a camera having a field of view of at least a portion of a location that includes the swimming pool or spa. The pool vision system includes a controller communicatively coupled with the camera. The controller may receive visual data from the camera and generate a control response based on the visual data, and the control response includes at least one of an alert to a user or control of at least one piece of equipment for the swimming pool or spa.

According to certain embodiments, a method of controlling equipment of a swimming pool or spa includes receiving visual data from a camera having a field of view including the equipment and identifying the equipment in the visual data and determining an operational state of the equipment based on the visual data. The method includes comparing the determined operational state of the equipment with an expected operational state of the equipment and generating a control response based on a difference between the determined operational state of the equipment and the expected operational state of the equipment.

According to various embodiments, a pool vision system for a swimming pool or spa includes a pool light with an integrated camera configured to obtain visual data of at least a portion of a location comprising a swimming pool or spa.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION OF THE INVENTION

Figure 1:
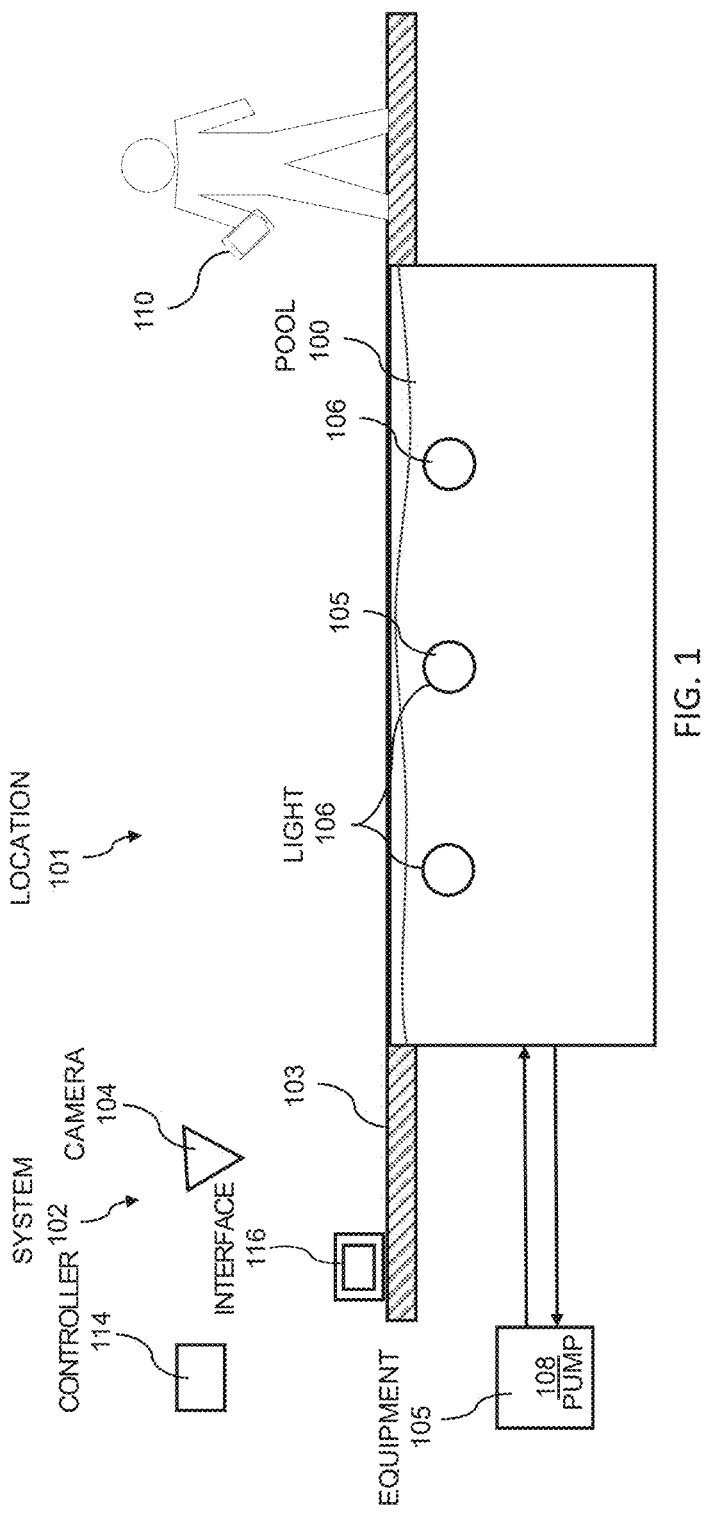
FIG. 1 illustrates a pool system according to embodiments.

Described herein are pool vision systems and associated methods for swimming pools and spas. The pool vision systems described herein may provide improved management of pool equipment compared to traditional manual approaches. The pool vision systems described herein additionally or alternatively may provide improved customization and personalization of the pool for a user to provide various feedback to the user and/or control of the pool equipment as desired.

According to various embodiments, the pool vision systems may include one or more cameras for monitoring a location associated with the swimming pool and sub-portions of the location as desired. As non-limiting examples, the one or more cameras may monitor a pool deck, a portion of the pool deck, a pool pad (e.g., a location with one or more pieces of equipment of the pool instead of the pool itself), the swimming pool, a portion of the swimming pool, combinations thereof, and/or other locations as desired. In some embodiments, one or more cameras optionally may be integrated with a piece of pool equipment. As a non-limiting example, a camera of the pool vision system may be integrated with a pool light, a skimmer, a docking station for a cleaner, a robotic or hydraulic pool cleaner, a pump, combinations thereof, and/or other pool equipment as desired. In one example, a pool light may include an integrated camera.

According to certain embodiments, the pool vision systems described herein may perform various analysis of visual data from the one or more cameras and/or generate various responses based on the visual data.

According to some embodiments, the camera of the pool vision system may communicate with a controller, such as but not limited to a remote or cloud-based controller, the controller may make a decision based on the data from the camera, and the controller may control one or more pieces of equipment based on the decision.

In some embodiments, the responses based on the visual data may be used to control one or more pieces of pool equipment. As a non-limiting example, the pool vision system may identify pool occupants (humans, pets, etc.), bather load, duration of use, etc. using the visual data, and based on the visual data, the pool vision system may generate a response for controlling pool equipment to adjust the water quality (e.g., to rebalance the water and increase sanitization based on a determined impact of the occupants on total dissolved solids (TDS) from the visual data). As another non-limiting example, the pool vision system may identify a user entering a pool deck area from the visual data, and based on the identified user (and optionally in conjunction with additional information), generate a response to retract the pool cover, turn on pool lights, adjust pool light settings, adjust a pH level, adjust a water temperature, etc.

In various embodiments, the responses based on the visual data may be used as feedback for the user. As a non-limiting example, the pool vision system may identify a user swimming laps in the pool and may count laps, cadence, duration, split time, etc., which optionally may be provided to the user (e.g., using an interface device of the pool vision system, via an application on the user's smartphone, by controlling pool equipment such as pool lights, etc.). In various embodiments, the pool vision system may control equipment as the feedback to the user. As a non-limiting example, the pool vision system may cause pool lights to have a first color during the start of training, a second color and/or pattern based on duration or progress of swimming a lap, and a third color and/or pattern based on a training session being completed, and a fourth color and/or pattern based on performance being above or below a preset threshold. Additionally, or alternatively, the pool vision system may communicate information to the user via a user interface and/or via an application on a user's device. As a non-limiting example, the pool vision system may provide workout results (e.g., split times, swim duration, types of strokes performed, etc.) to a user via an application on the user's smartphone.

Various other benefits and advantages may be realized with the devices and methods provided herein, and the aforementioned advantages should not be considered limiting.

FIG. 1 illustrates a pool 100 with a pool vision system 102 according to various embodiments. A location 101 associated with the pool 100 may include the pool 100 itself as well as a pool deck 103 and/or other areas as desired.

The pool vision system 102 includes one or more cameras 104 for monitoring at least a portion of the location 101 associated with the pool 100. The one or more cameras 104 may be various types of cameras or imaging devices as desired capable of obtaining visual images of at least a portion of the location 101. Non-limiting examples of cameras may include optical or video cameras, single or multi-stereo-cameras, RGB-D cameras, infrared cameras, UV cameras, combinations thereof, or otherwise as desired.

In FIG. 1, a single camera 104 is illustrated at a location above the pool deck 103 and outside of the pool 100; however, the number and location of the cameras 104 should not be considered limiting. As examples, in other embodiments, the pool vision system 102 may include a plurality of cameras provided at various locations outside and/or within the pool 100. When a plurality of cameras 104 are included, the cameras 104 need not all be the same type of camera. In various embodiments, one or more cameras 104 may be operable while submerged within the pool 100 and/or in water of the pool 100. In some embodiments, one or more cameras 104 may have a field of view including a pool pad and/or one or more pieces of equipment for the pool 102. Optionally, the field of vision of the camera 104 need no include the pool 100. As non-limiting examples, one or more cameras 104 may have a field of view that includes a valve on the pool pad, a docking station, a pool light, an entertainment feature (e.g., water feature, fire feature, etc.), the pump, a heater, combinations thereof, and/or as otherwise desired.

In certain embodiments, at least one piece of equipment 105 associated with the pool 100 may include a camera 104 integrated with the piece of equipment. As non-limiting examples, equipment 105 such as pool lights 106, a skimmer, a pump 108, a robotic or hydraulic cleaner, and/or other pieces of equipment 105 associated with the pool 100 may include one or more cameras 104 integrated with the equipment 105. Pool lights 106 may be within the pool 100 and/or outside of the pool 100 but in the pool location 101 (e.g., on a patio, pool deck, etc.). In one non-limiting example, one or more pool lights 106 may include the camera 104. In such embodiments, the camera 104 may be behind a lens of the pool light 106, mounted on the pool light 106 (e.g., sharing a common housing), and/or otherwise integrated into the pool light 1016 as desired.

In addition to the one or more cameras 104, the pool vision system 102 may include one or more controllers 114. The controller 114 may include a computer system and/or one or more processing units and/or one or more memory devices. The processing unit may be various suitable processing devices or combinations of devices including but not limited to one or more application specific integrated circuits, digital signal processors, digital signal processing devices, programmable logic devices, field programmable gate arrays, processors, controllers, micro-controllers, microprocessors, other electronic units, and/or a combination thereof. The one or more memory devices may be any machine-readable medium that can be accessed by the processor, including but not limited to any type of long term, short term, volatile, nonvolatile, or other storage medium, and is not to be limited to any particular type of memory or number of memories, or type of media upon which memory is stored. Moreover, as disclosed herein, the term "storage medium," "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data. The memory device may be local to the controller, portable, on a server, or in the cloud, among other locations.

The controller 114 may be provided at various locations, including both locations within or proximate to the pool 100 and/or locations remote from the pool 100. In one non-limiting example, the controller 114 may be a cloud-based controller 114.

In certain embodiments, the controller 114 optionally includes an associated user interface 116, including but not limited to a graphical user interface or a human machine interface, such that the controller 114 may obtain information from a user and/or provide information to the user. Optionally, the pool vision system 102 may include an interface such as a speaker, screen, touchpad, lights, switches, combinations thereof, and/or other human machine interface as desired for receiving information from and/or providing information to a user. In such embodiments, the controller 114 may be communicatively coupled to the interface using various wired or wireless techniques. The user interface and/or human machine interface may be on the controller 114 itself or may be at a location remote from the controller 114, such as on a user device, a dedicated user interface device, an operations control center remote from the pool 100, combinations thereof, and/or as otherwise desired. In various embodiments, a response by the controller may generate an alert or notification using the interface as a response.

The one or more controllers 114 may be communicatively connected to the one or more cameras 104. The one or more controllers 114 may be used to monitor various aspects of the pool 100 based on visual data from the one or more cameras 104. In various embodiments the one or more controllers 114 may generate a response based on the visual data. In some embodiments, a controller 114 may be provided on the camera 104, although in other embodiments, the controller 114 may be remote from the camera, and the visual data obtained by the one or more cameras 104 may be provided to the controller 114 using various communication techniques as desired. In some embodiments, and as discussed in detail below, the controller(s) 114 of the pool vision system 102 may be communicatively coupled with one or more pieces of equipment 105 and/or with one or more user devices 110 using various wired or wireless communication techniques as desired.

Figure 2:
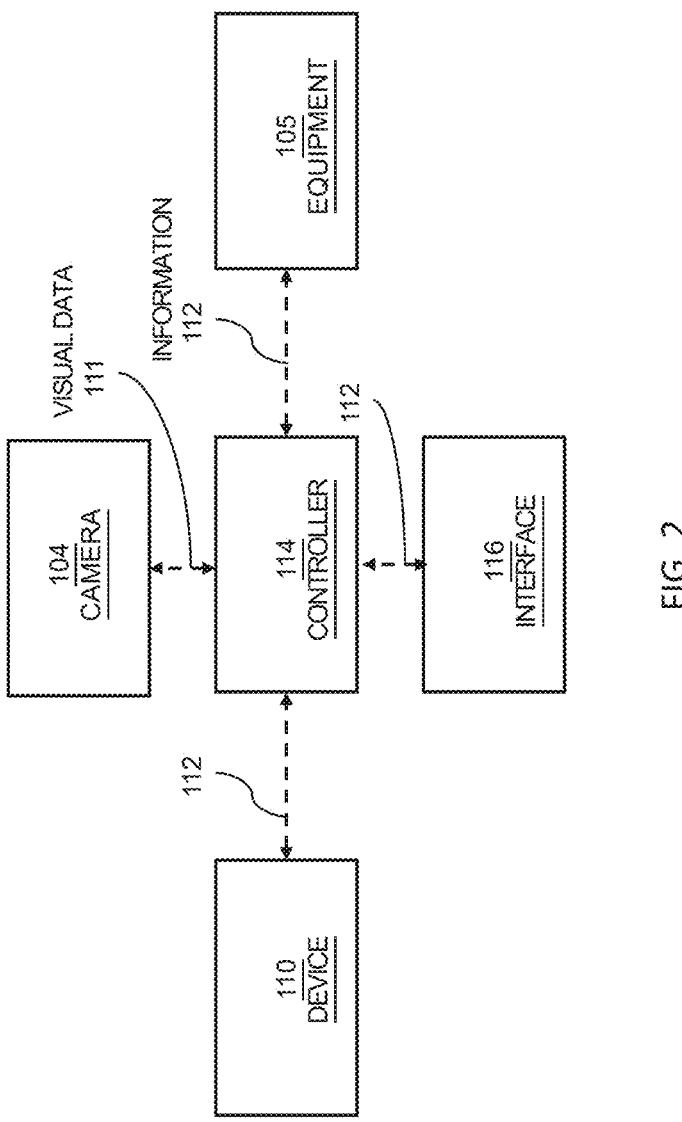
FIG. 2 illustrates components of the pool system of FIG. 1 according to embodiments.

As represented by FIG. 2, visual data 111 from the camera(s) 104 of the pool vision system 102 may be used by the controller 114 to provide information 112 to user devices 110, equipment 105, and/or an optional interface 116 as desired. The information 112 may be various types of information as desired, such as control responses, the visual data 111, other informational data, alerts, combinations thereof, and/or other information as desired. In some examples, the visual data 111 may be analyzed by the controller 114, and the information 112 provided by the controller 114 may be based on the analysis of the visual data 111. Examples are discussed in detail below, but the following examples should not be considered limiting.

In some embodiments, the visual data 111 from the one or more cameras 104 (and optionally additional information) may be used to control one or more pieces of equipment 105. Optionally, the equipment 105 may be controlled based on the visual data 111 indicating the occurrence of a predetermined condition and/or a predetermined event. However, the presence of a predetermined event or predetermined condition need not be required to control the equipment 105 using the pool vision system 102.

As a non-limiting example of control of equipment 105, the pool vision system 102 may identify a particular user based on the visual data 111, and a piece of equipment 105 may be controlled based on such an identification. As an example, the pool vision system 102 may identify a person as an authorized user of the pool and may generate a control response causing any one or more of a pool cover to retract, causing heating of the pool to a desired temperature, causing activation of pool lights, etc. based on the identification. Conversely, the pool vision system 102 may cause the pool cover to cover the pool based on an identification of an unauthorized user and based on additional information of the time of day or the pool owner being known to be away. As another example, the pool vision system 102 may cause the pool cover to cover the pool and/or generate an alert based on an identification of a child or other user who may pose a drowning risk.

As another non-limiting example of control of equipment 105, visual data 111 may be thermal readings from a thermal camera 104, and the visual data 111 may be used to control a pump filtration cycle. In this example, the thermal camera 104 may detect water stratification layering and/or other thermal information as desired. In this example, an automatic swimming pool cleaner (APC) as a piece of equipment 105 may make water temperature readings (e.g., using onboard or other sensing means) as the APC moves within the pool. The APC may be various types of robotic cleaners as desired, including but not limited to those described in U.S. Pat. Nos. 10,316,534, 9,488,154, 8,578,538, and U.S. Patent Publication No. 2014/0303810, all of which are hereby incorporated by reference in their entireties. The water temperature readings from the APC may be correlated with the visual data 111 from the thermal camera 104, and the combined information may be compared to a recirculation temperature in a heater for the pool to determine an actual volume of water that is treated. In this example, the filtration cycle for the pump may be ended based on the actual turnover of water as at least partially determined from the visual data 111. The improved control of the pump filtration cycle may save energy and costs for the pool owner.

As another non-limiting example, the pool vision system 102 may determine information about the movement of a user relative to the pool based on the visual data 111, and a piece of equipment 105 may be controlled based on such determined movement. As an example, the pool vision system 102 may detect a user swimming laps in the pool 100 based on the visual data and determine information about such swimming such as type of stroke, swim gait and stride, split time, etc. as desired. As the user swims, the pool vision system 102 may cause pool lights to change at least one characteristic (e.g., color, pattern, etc.) based on lap progress, elapsed time, workout duration, performance, etc. to provide a personalized swim workout for the user.

In another non-limiting example, the pool vision system 102 may determine information about the state or usage of the pool 100 based on the visual data 111, and a piece of equipment 105 may be controlled based on the determined state or usage. As an example, the pool vision system 102 may determine a significant amount of debris has entered the pool 100 after a storm based on the visual data 111, and the pool vision system 102 may generate a response activating pumps and/or a robotic cleaner for cleaning the debris and improving water quality. As another example, the pool vision system 102 may detect a number of occupants, a type of occupant (e.g., humans, animals, etc.), and/or a duration of usage based on the visual data 111, and the pool vision system 102 may calculate or estimate an impact on water quality based on the number, type, and/or duration of usage. In such embodiments, the pool vision system 102 may generate a response adjusting chemical dosing, filtration and/or other water quality controls to improve water quality.

In some embodiments, the visual data 111 from the one or more cameras 104 (and optionally additional information) may be used to determine operational information about one or more pieces of equipment 105, and equipment 105 may be controlled and/or a notification may be provided to the user based on the determined operational information. As a non-limiting example, the controller 114 may receive the visual data 111 from the one or more cameras 104 and identify one or more pieces of equipment 105 in the visual data 111. In certain embodiments, the controller 114 may identify an operational state of the identified equipment 105 and may compare the identified operational state to an expected or desired operational state. In such embodiments, the expected or operational state may be based on input from the user and/or determined by the controller 114.

As non-limiting examples, the controller 114 may expect pool lights 106 to be on and with a particular color or pattern based on a setting selected by the user and/or may expect an APC to be running because a pump is on. As further non-limiting examples, if a plurality of pool lights 106 are utilized (within the pool 100 and/or outside of the pool 100), the visual data 111 from the camera 104 may include information about one or more characteristics of the pool lights 106, such as but not limited to color, brightness, shade, pattern, etc. In such embodiments, the expected or desired state may be a desired color, shade, brightness, pattern, etc. Based on a difference between the detected operational state and the expected operational state, the controller 114 may control equipment 105 (e.g., reset the equipment) and/or generate an alert or notification to the user.

As a non-limiting example, with a plurality of pool lights 106, the controller 114 may identify one or more lights 106 with a color, shade, and/or brightness that does not match other pool lights 106 and/or as desired, and based on such differences, the controller 114 may attempt to reset the light 106, change the color, brightness, or shade of the light 106, change the other lights 106 to match the light 106 with the detected different characteristic, and/or notify the user. As another non-limiting example, the controller 114 may identify that a particular light 106 is running low and/or otherwise has a reduced operational state and may account for the reduced operational state by causing other lights 106 to match the reduced operational state, change the color of the light 106 with reduced operational state, change all (or a subset) of the lights 106 to another color, and/or notify the user.

As another non-limiting example, the visual data 111 from the camera 104 may include a fire feature and/or a water feature such as but not limited to a bubbler, waterfall, fountain, and/or as otherwise desired. The controller 114 may identify a state of such features and compared them to an expected state (e.g., an activated state), and control equipment and/or notify the user based on the fire features and/or water features not operating as expected. As non-limiting examples, the fire feature may not be on when the controller 114 expects the fire feature to be on, and the controller 114 may generate a notification to the user to check connections and/or the fire feature itself. As another non-limiting example, a waterfall may have a reduced flow or not flowing at all when the controller 114 expects a regular flow, and the controller 114 may attempt to reset the waterfall while also notifying the user.

As such, the pool vision system 102 may be utilized to identify if equipment 105 is not functioning as it should and may send an alert and/or take action if something is not operating as expected or correctly.

In various embodiments, the visual data 111 from the one or more cameras 104 (and optionally additional information) may be used for providing the information to the user device 110. As a non-limiting example, the pool vision system 102 may determine that an unauthorized person is at the location 101 based on the visual data 111, and the pool vision system 102 may send a notification to the pool owner's user device 110 (e.g., using an application on the user device 110). As another non-limiting example, the pool vision system 102 may monitor characteristics of a user's swimming workout (e.g., number of laps, types of strokes, duration, split times, etc.) based on the visual data 111, and the pool vision system 102 may provide a workout summary on the user's device with various information about the swimming workout. As a further non-limiting example, the pool vision system 102 may identify water quality issues due to type of occupant, duration of pool use, a number of occupants, etc. based on the visual data, and the pool vision system 102 may send alerts to the user device 110 and/or a summary of actions taken to control water quality to the user device 102.

In certain embodiments, the visual data 111 from the one or more cameras 104 (and optionally additional information) may be used for generating a response on the interface 116. As non-limiting examples, the pool vision system 102 may cause a speaker to emit sound and/or a screen to display a message based on the pool vision system 102 identifying an unauthorized user, an animal in the pool, a water quality issue, etc. from the visual data 111.

In other embodiments, the pool vision system 102 described herein may be used to provide various information to equipment 105, user devices 110, interfaces 116, etc. based on visual data 111 from one or more cameras 104 of the pool vision system 102. As mentioned, the pool vision system 102 optionally may generate responses based on supplemental information in addition to the visual data 111. Such supplemental information may be provided by a user and/or other sensors or devices communicatively coupled to the pool vision system 102 as desired. Supplemental information may include, but is not limited to, environmental information (including forecasts), water quality information from sensors (e.g., pH, water temperature, turbidity, etc.), user identifications, known statuses of users, operational statuses or conditions of equipment 105, geolocation information, combinations thereof, and/or other supplemental information as desired.

As another non-limiting example, the pool vision system 102 may identify and learn that a pool owner routinely works out doing laps every other morning. In such an example, the pool vision system 102 may learn this schedule and control equipment such that the pool is already warmed the pool owner's desired temperature. In some embodiments, a user device, such as but not limited to a smart watch app, may confirm the owner's swim intent based on geolocation as the pool is approached. In some embodiments, the pool vision system 102 may convey an audible message via user interface on user device or interface of the pool vision system 102 indicating the PH is normal, the water temp is a particular temperature (e.g., 85 degrees) and the water is balanced and ready to go. In certain embodiments, the pool vision system 102 may cause the pool cover to retract automatically when the owner says its ok to open and/or the pool vision system 102 identifies the pool owner in proximity to the pool. In some embodiments, the pool vision system 102 may control the pool lights to come on and set to a dim white color, and as the owner swims, the pool vision system 102 may control the light color to shift from white to lime then to flashing green as laps progress. The pool vision system 102 may measure the swim gait and stride and records split time. After the workout, the pool vision system 102 may provide the workout results to the pool owner proved on an application on the user device. Optionally, the application may prompt the pool owner and ask whether the pool cover may be closed.

In another non-limiting example, the family pet may utilize the pool along with teenagers. In this example, the camera 104 of the pool vision system 102 may measure bather load and duration of the pet in the water to calculate the impact on water quality. The pool vision system 102 may automatically adjust the chemical dosing to rebalance the water and increase sanitization. In some cases, the pool vision system 102 may generate a notification and a summary of the actions taken to the owner and/or the pool technician, as the owner wanted only to be notified of certain uses. In certain embodiments, the pool vision system 102 may learn the impact of the pet and/or teenagers on water quality over time, thereby allowing the pool vision system 102 to respond more quickly over time.

As a further non-limiting example, the pool vision system 102 may save a pool owner money by reducing the pump filtration cycle. In this example, the pool vision system 102 may calculate the pool's turnover time based on the actual water that has been treated rather than (or in addition to) making such a calculation based on a timer. In some examples, the turnover may be derived from an automatic swimming pool cleaner relaying temperature readings as it climbs the walls, which the pool vision system 102 may correlate with the camera's thermal reading on temperature stratification. The pool vision system may contrast this data to the recirculation temperature in the heater to determine an actual volume of water that has treated. In certain embodiments, the pool vision system 102 may control the equipment of the pool such that the filtration cycle ends based on the actual turnover. Optionally, the resulting monetary and/or energy savings are calculated and stored, and such savings may be provided to a user on an application running on the user's device.

The aforementioned examples of pools with pool vision are for illustrative purposes only and should not be considered limiting, and in other embodiments, pool vision may be used for various other control and/or information activities as desired.

Exemplary concepts or combinations of features of the invention may include:

A. A pool vision system for a swimming pool or spa, the pool vision system comprising a processor and a camera configured to monitor a location comprising the swimming pool or spa.

B. The pool vision system according to any preceding or subsequent statement or combination of statements, wherein the processor is configured to control equipment for the swimming pool or spa based on visual data from the camera.

C. The pool vision system according to any preceding or subsequent statement or combination of statements, wherein the processor is configured to generate a control response based on an analysis of the visual data.

D. The pool vision system according to any preceding or subsequent statement or combination of statements, wherein the processor is configured to generate the control response based on a determination that the visual data includes a predetermined condition.

E. The pool vision system according to any preceding or subsequent statement or combination of statements, wherein the processor is configured to send a control signal to pool equipment or information to a user device as the control response.

F. A pool vision system comprising a camera for monitoring a location comprising a swimming pool or spa.

G. The pool vision system according to any preceding or subsequent statement or combination of statements, wherein the camera is submerged within the swimming pool or spa.

H. The pool vision system according to any preceding or subsequent statement or combination of statements, wherein the camera is configured to monitor a pool deck or surface at least partially surrounding the swimming pool or spa.

I. The pool vision system according to any preceding or subsequent statement or combination of statements, further comprising a pool light, wherein the camera is integrated into the pool light.

J. A pool vision system comprising a camera for monitoring occupants of a swimming pool or spa, the pool vision system configured to generate a response based on visual data from the camera.

K. The pool vision system according to any preceding or subsequent statement or combination of statements, wherein the pool vision system is configured to generate a training response based on detected movement of at least one occupant of the swimming pool.

L. The pool vision system according to any preceding or subsequent statement or combination of statements, wherein the training response comprises controlling equipment or sending information to a user device.

M. The pool vision system according to any preceding or subsequent statement or combination of statements, wherein the detected movement comprises one or more of a swimming cadence, a number of swimming laps completed, and/or a type of swimming stroke.

N. The pool vision system according to any preceding or subsequent statement or combination of statements, wherein the pool vision system is configured to generate the training response based on a comparison of the detected movement with desired movement.

O. The pool vision system according to any preceding or subsequent statement or combination of statements, wherein the pool vision system is configured to control equipment for the swimming pool or spa based on a number and/or type of occupants in the visual data.

P. A pool light for a swimming pool or spa comprising a camera integrated with the pool light.

Q. A method of operating a swimming pool or spa, the method comprising monitoring occupants of a swimming pool or spa using a camera of a pool vision system and generating a response based on visual data from the camera.

R. A method of determining water turnover rate in a swimming pool or spa based on a temperature information from an automatic swimming pool cleaner and visual data from a thermal camera of a pool vision system.

S. A pool vision system comprising a thermal camera configured to detect water stratification layering within a swimming pool or spa.

T. A method of controlling a pump filtration cycle based on an actual turnover determination using a pool vision camera system.

U. A pool vision system for a swimming pool or spa, the pool vision system comprising: a camera comprising a field of view of at least a portion of a location comprising the swimming pool or spa; and a controller communicatively coupled with the camera, wherein the controller is configured to receive visual data from the camera and generate a control response based on the visual data, wherein the control response comprises at least one of an alert to a user or control of at least one piece of equipment for the swimming pool or spa.

V. The pool vision system according to any preceding or subsequent statement or combination of statements, wherein the controller is configured to: identify equipment in the visual data and determine an operational state of the equipment based on the visual data; compare the determined operational state of the equipment with an expected operational state of the equipment; and generate the control response based on a difference between the determined operational state of the equipment and the expected operational state of the equipment.

W. The pool vision system according to any preceding or subsequent statement or combination of statements, wherein the equipment comprises at least one of a pool light, a pump, an automatic swimming pool cleaner, an entertainment feature, or a pool cover.

X. The pool vision system according to any preceding or subsequent statement or combination of statements, wherein the controller is remote from the camera.

Y. The pool vision system according to any preceding or subsequent statement or combination of statements, wherein the controller is configured to: identify at least one occupant in the swimming pool based on the visual data; detect movement of the occupant in the swimming pool based on the visual data; and generate a training response based on the detected movement of at least one occupant of the swimming pool.

Z. The pool vision system according to any preceding or subsequent statement or combination of statements, wherein the training response comprises controlling equipment or sending information to a user device, and wherein the detected movement comprises one or more of a swimming cadence, a number of swimming laps completed, and/or a type of swimming stroke.

AA. The pool vision system according to any preceding or subsequent statement or combination of statements, wherein the controller is configured to: identify a plurality of pool lights in the visual and determine a state of at least one characteristic of each pool light based on the visual data; and generate the control response controlling at least one light of the plurality of lights based on a difference in state of the at least one characteristic relative to another light.

BB. A method of controlling equipment of a swimming pool or spa, the method comprising: receiving visual data from a camera having a field of view including the equipment; identifying the equipment in the visual data and determining an operational state of the equipment based on the visual data; comparing the determined operational state of the equipment with an expected operational state of the equipment; and generating a control response based on a difference between the determined operational state of the equipment and the expected operational state of the equipment.

CC. The method according to any preceding or subsequent statement or combination of statements, wherein the equipment comprises a pool light, and wherein the operational state comprises a color, shade, or brightness of light emitted by the pool light.

DD. The method according to any preceding or subsequent statement or combination of statements, wherein the expected operational state comprises an operational state of another pool light.

EE. The method according to any preceding or subsequent statement or combination of statements, wherein the equipment comprises a valve, and wherein the operational state comprises a status of the valve.

FF. The method according to any preceding or subsequent statement or combination of statements, wherein the equipment comprises an automatic swimming pool cleaner, and wherein the operational state comprises a docking status or a cleaning cycle status.

GG. The method according to any preceding or subsequent statement or combination of statements, wherein the equipment is a first piece of equipment, and wherein the expected operational state is based on an operational state of a second piece of equipment.

HH. The method according to any preceding or subsequent statement or combination of statements, wherein generating the control response comprises at least one of: controlling the equipment; controlling another piece of equipment for the swimming pool or spa; or generating an alert or notification for a user.

II. A swimming pool or spa comprising a pool vision system for controlling a piece of equipment pursuant to the method according to any preceding or subsequent statement or combination of statements.

JJ. A pool vision system for a swimming pool or spa, the pool vision system comprising a pool light with an integrated camera configured to obtain visual data of at least a portion of a location comprising a swimming pool or spa.

KK. The pool vision system according to any preceding or subsequent statement or combination of statements, wherein the pool light is submerged within the swimming pool or spa.

LL. The pool vision system according to any preceding or subsequent statement or combination of statements, wherein the pool light is outside of the swimming pool or spa.

MM. The pool vision system according to any preceding or subsequent statement or combination of statements, further comprising a controller remote from the pool light and communicatively coupled with the camera, wherein the controller is configured to receive the visual data from the camera and generate a control response based on an analysis of the visual data, wherein the control response comprises at least one of an alert or a control of at least one piece of equipment.

NN. The pool vision system according to any preceding or subsequent statement or combination of statements, wherein the camera is behind a lens of the pool light or integrated into a housing of the pool light.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Finally, references to "pools" and "swimming pools" herein may also refer to spas or other water containing vessels used for recreation, training, or therapy and for which cleaning of debris is needed or desired.

That which is claimed:

1. A pool vision system for a swimming pool or spa, the pool vision system comprising:
   a camera comprising a field of view of at least a portion of a location comprising the swimming pool or spa; and
   a controller communicatively coupled with the camera, wherein the controller is configured to:
      receive visual data from the camera and identify a plurality of pool lights in the field of view;
      identify a first pool light of the plurality of pool lights with a characteristic that is different from a characteristic of a second pool light of the plurality of pool lights; and
      generate a control response based on the visual data and the detected different characteristics, wherein the control response comprises at least one of controlling the first pool light such that the characteristic of the first pool light matches the characteristic of the second pool light, resetting the first pool light, or controlling the second pool light such that the characteristic of the second pool light matches the characteristic of the first pool light.

2. The pool vision system of claim 1, wherein the controller is configured to:
   identify supplemental equipment in the visual data in addition to the plurality of pool lights and determine an operational state of the supplemental equipment based on the visual data;
   compare the determined operational state of the supplemental equipment with an expected operational state of the supplemental equipment; and
   generate the control response based on a difference between the determined operational state of the supplemental equipment and the expected operational state of the supplemental equipment.

3. The pool vision system of claim 2, wherein the supplemental equipment comprises at least one of a pump, an automatic swimming pool cleaner, an entertainment feature, or a pool cover.

4. The pool vision system of claim 1, wherein the controller is remote from the camera.

5. The pool vision system of claim 1, wherein the controller is configured to:
   identify at least one occupant in the swimming pool based on the visual data;
   detect movement of the occupant in the swimming pool based on the visual data; and
   generate a training response based on the detected movement of at least one occupant of the swimming pool.

6. The pool vision system of claim 5, wherein the training response comprises controlling equipment or sending information to a user device, and wherein the detected movement comprises one or more of a swimming cadence, a number of swimming laps completed, and/or a type of swimming stroke.

7. A swimming pool or spa comprising the pool vision system of claim 1.

8. The pool vision system of claim 1, further comprising a pool light, wherein the camera is integrated with the pool light.

9. The pool vision system of claim 8, wherein the pool light is submerged within the swimming pool or spa.

10. The pool vision system of claim 8, wherein the pool light is outside of the swimming pool or spa.

11. The pool vision system of claim 8, wherein the camera is behind a lens of the pool light or integrated into a housing of the pool light.

12. A pool vision system for a swimming pool or spa, the pool vision system comprising:
   a camera comprising a field of view of at least a portion of a location comprising the swimming pool or spa; and
   a controller communicatively coupled with the camera, wherein the controller is configured to receive visual data from the camera, wherein the controller is configured to:
   identify a plurality of pool lights in the visual and determine a state of at least one characteristic of each pool light based on the visual data;
   identify that the at least one characteristic of a first pool light of the plurality of pool lights is different from the other pool lights of the plurality of pool lights; and
   responsive to the detected different at least one characteristic, generate a control response by at least one of controlling the other pool lights of the plurality of pool lights to match the at least one characteristic of the first pool light or changing a color of the first pool light from a first color to a second color.

* * * * *